May 19, 1964  J. A. SIMMS  3,133,854
POLYVINYL FLUORIDE LAMINATES AND PROCESS FOR MAKING SAME
Filed Nov. 15, 1960
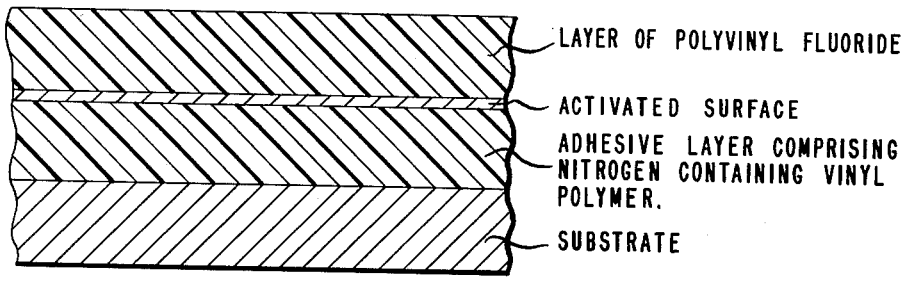
INVENTOR
John A. SIMMS
BY
ATTORNEY

United States Patent Office 3,133,854
Patented May 19, 1964

3,133,854
POLYVINYL FLUORIDE LAMINATES AND PROCESS FOR MAKING SAME
John Alvin Simms, Wilmington, Del., assignor to E. I. du Pont de Nemours and Company, Wilmington, Del., a corporation of Delaware
Filed Nov. 15, 1960, Ser. No. 69,321
8 Claims. (Cl. 161—189)

This invention relates to laminates and more particularly to polyvinyl fluoride laminates.

Polyvinyl fluoride has an excellent combination of properties such as, for example, weather resistance, abrasion resistance, resistance to soiling and solvent resistance. In addition, polyvinyl fluoride can be easily embossed or otherwise postformed. These and other properties make polyvinyl fluoride particularly attractive for use in laminates and particularly as a weather-resistant, abrasion-resistant, readily cleanable, postformed top layer for laminates. However, polyvinyl fluoride is very difficult to adhere to other materials.

Most adhesives commonly employed commercially to form laminates have relatively poor adhesive bond strengths when they are used to laminate polyvinyl fluoride. Thus, the first prerequisite of an adhesive for the laminates of this invention is high adhesive strength to polyvinyl fluoride. Preferably, in polyvinyl fluoride laminates, the intermediate adhesive layer should not only form a strong adhesive bond with the adjacent layers but, also, should have high cohesive strength. Preferably, with laminates containing thin, for example, 1 to 5 mil-thick, flexible layers of polyvinyl fluoride, the polyvinyl fluoride layer should fail before the intermediate adhesive layer fails either cohesively or adhesively. In such a case, if the intermediate adhesive layer does not extend quite to the edge of the laminate or, for example, if the laminate becomes partially delaminated, and the unadhered layers are separated, one or both unadhered layers will tear at the edge of the adhesive rather than completely separate, that is, propagate the delamination.

Those specialized materials which have been developed to improve bonding in laminates of polyvinyl fluoride have been generally subject to one or more of the following disadvantages. First, many adhesives have poor weathering properties and in particular, for example, discolor on prolonged weathering. Thus, where a clear or lightly pigmented film of polyvinyl fluoride is laminated to a colored substrate, the desirable coloring effect of the substrate is often destroyed, for example, by yellowing. Other adhesives, such as epoxy adhesives, present fabrication problems; for example, some such adhesives must be supplied in two-package systems which must be mixed just prior to fabrication while other such adhesives require prolonged curing sometimes at elevated temperature to develop appreciable bond strengths. With other polyvinyl fluoride laminates, folding, postforming and other fabrication techniques cause failure and delamination at the adhesive layer.

This invention provides polyvinyl fluoride laminates, in which the adhesive layers have both high adhesive and high cohesive strength, which are weather resistant and which are readily formable into a wide variety of shapes without loss of interlayer adhesion or cohesion. Also, the laminates of this invention do not require prolonged aging and the adhesive therein is a stable, one-package system.

The laminates of this invention comprise a substrate, a preformed layer of polyvinyl fluoride at least one surface of which having been chemically activated, and between said substrate and said activated surface, an intermediate adhesive layer, said adhesive layer comprising a vinyl addition polymer having substituents each of which bears on adjacent carbon atoms a hydroxyl radical and an amino radical bearing at least one active hydrogen atom, the amino radicals in the substituents containing about from 0.01 to 1.0% and preferably 0.2 to 0.4% of amino nitrogen, based on the weight of the polymer.

The accompanying drawing shows a representative cross-section of a laminate of this invention.

The polyvinyl fluoride layer used in the laminates of this invention is preferably in the form of a sheet or film. Such sheets and films of polyvinyl fluoride may be formed by known procedures such as those described in U.S. Patent No. 2,953,818 and in U.S. application Serial No. 801,441, filed March 24, 1959, by Robert S. Prengle and Robert L. Richards, Jr. One method of forming such sheets and films comprises feeding a mixture of latent solvent and polyvinyl fluoride to a heated extruder which is connected to a slotted casting hopper. A tough coalesced exudate of polyvinyl fluoride is extruded continuously in the form of a sheet or film containing latent solvent. The sheet or film can be merely dried or, alternately, it can be heated and stretched in one or more directions while solvent is volatilized therefrom. Sheets and films of polyvinyl fluoride also can be cast from dilute hot solutions of the polymer in latent solvent as described in U.S. Patent Nos. 2,419,008 and 2,419,010. If desired, various color and opacity effects can be achieved by incorporating pigments and fillers in the polyvinyl fluoride film during the manufacture thereof. Examples of pigments and fillers are metallic oxides, hydroxides, chromates, silicates, sulfides, sulfates and carbonates, organic dyes and lakes thereof and carbon blacks.

Each surface of the polyvinyl fluoride film which is to be adhered to another layer of the laminates of this invention is chemically activated, that is, is made surface receptive by forming in the surface layer thereof functional groups selected from one or more of the class consisting of hydroxyl, carboxyl, carbonyl, amino, amido and ethylenically unsaturated radicals. Means for activating the surface of the polyvinyl fluoride sheets and films are, for example, exposing the film to a gaseous Lewis acid such as boron trifluoride, aluminum trichloride or titanium tetrachloride or a liquid composition containing a coordination complex thereof, exposing the film to concentrated sulfuric acid, fuming sulfuric acid, sulfur trioxide or hot sodium hydroxide, exposing one surface of the sheet or film to an open flame while cooling the opposite surface and subjecting the film to a high-frequency, spark discharge.

In particular, for example, sheets or films of polyvinyl fluoride can be passed through a stainless steel lined treating chamber containing a gaseous mixture consisting of about from 1 to 90% by volume of boron trifluoride held at a temperature of about from 20 to 75° C. Dwell time in the chamber is usually on the order of 3 to 30 seconds. After the treatment with the boron trifluoride, the resulting film is either washed in ammonium hydroxide, washed in water, then air dried or merely washed in water and dried or alternately, heated for a brief period at a temperature of about from 100 to 150° C. Another alternate procedure is to contact at least one surface of the polyvinyl fluoride layer with concentrated sulfuric acid, fuming sulfuric acid or sulfur trioxide, for example, for about from 2 seconds to 1 minute. The resulting product is washed in water and air dried. Preferably, the acid solution is held at slightly elevated temperature, for example, about 25 to 95° C., the higher the temperature used, the less the contact time required. Still another procedure is to immerse the polyvinyl fluoride sheet or film briefly in a boron trifluoride-ethyl etherate complex, wash the resulting product with water, acetone or ethyl ether, then air dry the final product. Alternately, since boron trifluoride coordinates or complexes with a wide variety of organic compounds, particularly amines and oxygen-containing compounds such as ethers, alcohols, esters, acids and amides, complexes other than that with diethyl ether may be employed to chemically activate films of polyvinyl fluoride. For example, the complexes of boron trifluoride with dimethyl ether, methyl ethyl ether and phenol are particularly useful because they, like the diethyl ether complex, are liquids at room temperature. Slightly elevated temperatures are preferably employed to increase the rate of dissociation of the complex, thus shortening the immersion time necessary to effect a satisfactory degree of chemical activation. A still further example of a method for activating the surface of the polyvinyl fluoride layer is to pass a sheet or film of polyvinyl fluoride at a rate of about 100 to 250 feet per minute over and in contact with a chilled metal drum while the surface not in contact with the drum passes through a flame, for example, a flame of a gas burner fueled with a 1:20, propane:air mixture. A still further method for activating the surface of the polyvinyl fluoride layer is to subject the layer to high frequency spark discharge, preferably in an atmosphere of, for example, nitrogen, ammonia, boron trifluoride, oxygen or air. This can be done, for example, by passing a sheet or film of polyvinyl fluoride at a rate of about from 10 to 300 feet per minute over and in contact with a grounded metal drum while the surface away from the drum passes under and in close proximity to (for example, 0.010 to 0.025 inch) the rod or bar serving as an electrode and connected to a source of high-frequency alternating potential.

Examples of substrates which can be used in the laminates of this invention are metal substrates such as those of iron, steel, galvanized iron and steel, aluminum, aluminized steel, chromium, bronze, brass, lead, tin and nickel; glass and other vitreous substrates such as those of porcelain and china; impregnated substrates such as asphalt-impregnated cellulosics; hardboards such as "Masonite;" cement-asbestos boards; wood substrates such as those of birch, oak, fir, pine, hemlock, cedar, redwood, poplar and ash; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetate. Composite substrates such as plywood or fabrics which are coated, impregnated or both, are particularly useful. As shown in the following examples, prior to lamination, metallic substrates can and usually are given a conventional passivation or corrosion-inhibiting treatment such as that used commercially to prepare substrates for painting. Substrates comprising metals, cementitious materials, wood and other cellulosic materials, sheets and films of vinyl chloride polymer and fabrics coated or coated and impregnated especially with vinyl chloride polymer are particularly preferred. Of course, a second layer of polyvinyl fluoride can also be used as a substrate.

As mentioned hereinbefore the laminates of this invention contain an intermediate adhesive layer comprising a vinyl addition polymer having substituents each bearing a hydroxyl and an amino radical bonded to adjacent carbon atoms. Preferably, such vinyl addition polymers are prepared by copolymerizing one or more ethylenically unsaturated monomers with a small portion of monomer containing pendent epoxy substituents, for example, by well known methods of bulk, solution, emulsion or granular polymerization in the presence of free radical catalysts. The resulting copolymer is then reacted with ammonia or a primary monoamine to yield the polymers used herein. Alternately, ammonia or a primary monoamine can be reacted with an ethylenically unsaturated monomer containing a pendent epoxy substituent and the resulting ammoniated or aminated monomer copolymerized with another, and epoxy-free, vinyl monomer.

Examples of vinyl monomers which can be used as the major constituent of the vinyl polymers used in the adhesive compositions of this invention are derivatives of alpha, beta-unsaturated acids including methyl acrylate, ethyl acrylate, cyclohexyl acrylate, benzyl acrylate, naphthyl acrylate, octyl acrylate, tertiary-butyl acrylate, methyl methacrylate, ethyl methacrylate, butyl methacrylate, octyl methacrylate, stearyl methacrylate, butyl ethacrylate, ethyl alpha-chloroacrylate, ethyl alpha-phenylacrylate, dimethyl itaconate, ethyl alpha-methoxyacrylate, propyl alpha-cyanoacrylate, hexyl alpha-methylthioacrylate, cyclohexyl alpha-phenylsulfonyl acrylate, tertiary-butyl ethacrylate, ethyl crotonate, dimethyl maleate, isopropyl cinnamate, butyl beta-methoxyacrylate, cyclohexyl beta-chloroacrylate, acrylamide, alpha-phenylacrylamide, methacrylamide, N,N-dimethylacrylamide, N-cyclohexylmethacrylamide, itaconamide, acrylonitrile, crotonitrile, alpha-chloroacrylonitrile, methacrylonitrile, alpha-phenyl acrylonitrile, N-phenyl maleimide, N-butyl itaconimide and mixtures thereof; vinyl derivatives such as vinyl acetate, vinyl benzoate, vinyl pimelate, vinyl stearate, vinyl methyl ether, vinyl butyl ether, vinyl phenyl sulfide, vinyl dodecyl sulfide, vinyl butyl sulfone, vinyl cyclohexyl sulfone, vinyl chloride, vinyl fluoride, N-vinyl benzenesulfonamide, N-vinyl acetamide, N-vinyl caprolactam, styrene and vinyl toluene; allyl derivatives such as allyl phenyl ether, allyl cyclohexylacetate, N,N-dimethylallylamine, ethyl allyloxyacetate, allylbenzene, allyl cyanide and allyl ethyl sulfide; methylene type derivatives such as diethyl methylenemalonate, diketene, ethylene glycol ketene acetal, methylene cyclopentane, vinylidene chloride and vinylidene disulfones; miscellaneous compounds such as vinylene carbonate, acrolein acetals, methyl vinyl ketones, vinyl phosphonates, allyl phosphonates, vinyl trialkoxysilanes; and mixtures thereof. Of the aforementioned, epoxy-free vinyl monomers, acrylic esters, particularly esters of acrylic and methacrylic acids with 1 to 8 carbon-atom, alkyl-, aryl- or cyclo-aliphatic alcohols are preferred. Polymers containing at least 25% by weight of methyl methacrylate are especially useful because they can be readily and cheaply prepared, are easy to use on conventional equipment and have a good combination of adhesive and cohesive strength and weather-resistance. Preferably, for optimum cohesive strength the polymers of this invention have a glass transition temperature, that is, second order transition temperature, of at least about 35° C. The glass transition temperatures can be determined, for example, in a manner similar to that described by J. J. Keavney and E. C. Eberlin in the Journal of Applied Polymer Science, 3, p. 47 (1960). Briefly, the change in heat capacity which characteristically marks the glass transition temperature of a polymer is measured by heating an aluminum block containing a test sample and a control sample at a rate of roughly 4° C. per minute and measuring the difference between the temperature of the samples; a difference between the temperatures of the samples marks the glass transition temperature. Below the glass transition temperature, the test sample and control are at substantially the same temperature.

Epoxy-containing monomers which can be used in preparing the polymers used in the adhesive compositions in the intermediate layer of the laminates of this invention are, for example, glycidyl methacrylate, glycidyl acrylate, allyl glycidyl ether, butadiene monoepoxide, vinyl-cyclohexene epoxide, glycidyl oxyethyl vinyl sulfide, glycidyl sorbate, glycidyl ricinoleate, glycidyl vinyl phthalate, glycidyl allyl phthalate, glycidyl allyl maleate, glycidyl vinyl ether, allyl alpha,beta-epoxyisovalerate and mixtures thereof. Glycidyl acrylate and methacrylate are particularly preferred because they can be copolymerized readily in small controlled amounts and the epoxy group introduced thereby reacts readily and substantially completely with ammonia and amines.

As noted above, by the preferred procedure copolymers of the aforementioned epoxy-free monomers and epoxy-containing monomers prepared by conventional procedures, are next aminated or ammoniated with ammonia or a primary monoamine. Illustrative primary monoamines are methyl amine, ethyl amine, isopropyl amine, n-butyl amine, isobutyl amine, stearyl amine, cyclohexyl amine, naphthyl amine, aniline, toluidene, 2-amino-furan, furfuryl amine, ethanol amine, propanol amine, 2-amino-1-butanol, benzyl amine, o-propylamino phenol, alpha-methoxypropyl amine, beta-aminopropionitrile, tertiary-butyl amine, tertiary-octyl amine, soya amine, tall oil amine and mixtures thereof. Ammonia and simple aliphatic 1 to 4 carbon-atom alkyl and alkanol amines are particularly preferred because they react rapidly, show a minimum of steric hindrance and yield adhesive compositions which have particularly outstanding adhesion in the laminates of this invention. Ammonia is particularly preferred because it reacts rapidly and completely and is relatively inexpensive.

Ammonia or a primary monoamine together with the copolymer are heated until the reaction of the amine or ammonia and the epoxy groups in the copolymer has run substantially to completion. Volatile amines and ammonia preferably are heated in a closed system under a pressure of about from 20 to 200 p.s.i. Particular reaction conditions vary with the amount and reactivity of the amine or ammonia. Usually, the reaction mixture is heated for about from 2 to 30 hours, and preferably 5 to 10 hours at about from 50 to 150° C. and preferably 70 to 100° C. Preferably, an excess of ammonia or primary monoamine is added to the reaction mixture. This speeds the reaction and insures that substantially all of the epoxy groups react. Using an excess of ammonia or primary monoamine and, in the case of volatile amines such as ammonia, methyl amine and the like, running the reaction under pressure, also insures that substantially all of the epoxy groups each react with only one molecule of ammonia or amine; therefore, crosslinking and gellation is minimized. The amount of unreacted epoxy groups, hence, the completeness of the reaction, can be determined by adding hydrochloric acid to a portion of the reaction mixture, then back titrating the resulting solution with silver nitrate.

The amination reaction is carried out in volatile solvents such as, for example, toluene, xylene, butanol, pentanol, isopropanol, cyclopentane, octane, ethoxyethanol and other aliphatic, cycloaliphatic and aromatic hydrocarbons, alcohols, ethers and mixtures thereof. Hydroxylated solvents, such as alcohols, preferably form at least part of the solvent mixture particularly when ammonia is used as the amino-nitrogen contributing reactant. After the amination reaction, the reaction mixture containing the vinyl addition polymer having pendent substituents bearing hydroxyl and amino radicals is diluted to application consistency usually, about from 10 to 40% solids depending largely upon the application technique to be employed. Optionally, small portions of conventional pigments, fillers, plasticizers, flow-control agents, dispersing agents, antioxidants, ultraviolet light absorbers, and even small portions of other film-forming materials can be added to the adhesive compositions for the intermediate layer in the laminates of this invention.

Laminates of this invention are prepared by coating the aforementioned adhesive compositions on one or both surfaces of each pair of surfaces to be adhered, drying the adhesive to remove solvent therein, and heating the resulting product to above its glass transition temperature, that is, above the temperature at which the adhesive will flow under pressure, and preferably to about from 50 to 100° C. above its glass transition temperature. The surfaces to be adhered by the adhesive composition are brought together and the resulting product is pressed while the adhesive is maintained at about the above temperatures. With the preferred acrylic polymers, one method for forming a laminate of this invention comprises, for example, coating the adhesive onto the substrate, partially drying the adhesive at room temperature for about 10 to 120 minutes, heating the coated substrate at a temperature of about from 125 to 300° C. for about from 300 to 10 seconds, and preferably about from 150 to 250° C. for about from 60 to 10 seconds, then immediately applying a preformed layer of polyvinyl fluoride to the hot adhesive and passing the resulting structure through nip rolls. Alternately, instead of or in addition to using nip rolls, the structure with hot adhesive can be inserted in a press and held at a temperature of about from 250 to 150° C. for about from 0.5 to 10 minutes under a pressure sufficient to bring the layers to be adhered into intimate contact and preferably of about 100 to 5,000 pounds per square inch.

The laminates of this invention can consist of a layer of polyvinyl fluoride and a substrate adhered with a layer of the aforementioned adhesive. Alternately, however, the laminates of this invention can, of course, comprise two or more layers of polyvinyl fluoride adhered with intermediate adhesive layers of this invention. Also, several alternate layers of the substrate and polyvinyl fluoride can be adhered with adhesive layers. Substrates comprising two or more layers, for example, plywood or coated fabrics can also be used.

The products of this invention have outstanding weather resistance and abrasion resistance and can be easily cleaned. In addition, they have excellent interlayer adhesion and also good resistance to delamination by failure at the intermediate adhesive layer. The products also can be easily and conveniently formed in conventional laminating apparatuses without prolonged curing or aging. Products of this invention comprising a formable substrate, such as a coated fabric or sheet metal, can be easily postformed into intricate shapes without delamination.

The products of this invention because of their excellent combination of weather resistance, abrasion resistance, solvent resistance, formability and excellent interlayer adhesion find ready use in many fields. In the construction field, both pigmented and clear polyvinyl fluoride films can be laminated to such substrates as cold-rolled steel, galvanized and/or aluminized steel, aluminum, plywood, hardboards such as "Masonite," cement-asbestos boards and asphalt impregnated cellulosic boards for use as siding and/or roofing for houses and other domestic structures as well as for commercial, institutional and industrial buildings. Laminations to metal and wooden substrates can be employed in the manufacture of outdoor signs, wall tile, wall and ceiling paneling, venetian blinds, interior partitioning, awnings, ductwork, counter- and table-tops, store fronts, rain gutters and downspouts. Laminations to metal, particularly of pigmented polyvinyl fluoride films, can be postformed and employed to replace enameled and baked wall, ceiling, floor and side members of appliances such as refrigerators, freezers, air conditioners, dehumidifiers, hot-water heaters, washers and driers, kitchen cupboards and cabinets. In the automotive field, laminations of clear, metallized and pigmented polyvinyl fluoride films to metal substrates can be employed variously as automobile door and side paneling, hard tops, moldings, interior and exterior trim, instrument paneling, wheel covers and hub caps, siding and tops for house trailers and truck and van bodies. Laminated to coated or uncoated fabrics or to polymeric films, polyvinyl fluoride films can serve as headliners, seat covers, floor mats and trunk liners. Other uses for the laminates of this invention include upholstery, floor coverings, lamp shades and book bindings.

In the following examples which illustrate this invention parts and percentages are by weight unless otherwise specified.

EXAMPLE 1

*Preparation of Adhesive*

The following materials are charged to a closed reaction vessel and held under a nitrogen blanket for 6 hours at 90° C.:

| | Parts |
|---|---|
| Methyl methacrylate | 299.5 |
| Butyl methacrylate | 670.4 |
| Glycidyl methacrylate | 30.0 |
| Toluene | 667 |
| Alpha,alpha'-azodiisobutyronitrile | 2 |

The resulting polymer has an inherent viscosity of 0.50 measured in a 0.5% solution of methyl ethyl ketone at 25° C. which corresponds to a molecular weight of about 225,000 and has a glass transition temperature of about 53° C. The above reaction mixture is diluted with 1,800 parts of isopropyl alcohol and 530 parts of toluene. The resulting solution has a Brookfield viscosity of 0.9 poise using No. 1 spindle at 6 r.p.m.

The reaction mixture above is charged to an autoclave, then anhydrous ammonia is charged thereto to a pressure of 100 p.s.i. and at a temperature of 25° C. The reaction mixture is next heated to 70° C. under autogenous pressure and held at that temperature for 24 hours, then cooled. Excess ammonia is vented from the reaction vessel, then the polymer solution is heated to 50° C. under a pressure of 90 millimeters of mercury absolute for 16 hours to strip off the remaining excess ammonia. The resulting solution contains about 25% solids and has a Brookfield viscosity of about 1.5 poises using a No. 1 spindle at 6 r.p.m. The polymer contains about 0.30% of amino nitrogen.

*Preparation of Laminate*

A biaxially oriented, 2-mil film of polyvinyl fluoride pigmented with titanium dioxide is made surface receptive by holding it for 10 to 20 seconds in an atmosphere containing a gaseous mixture of air and 1 to 12% by volume of boron trifluoride maintained at 25 to 35° C. Finally, the film is washed with a 5% aqueous solution of ammonium hydroxide, then washed with water and dried.

An aluminum panel treated in the conventional manner with an acid chromate bath to form an aluminum chromate deposit is coated with a 2.4-mil film of the adhesive solution described above. The panels are dried at room temperature for 30 minutes, then baked for 1 minute in an oven at 230° C. The aforementioned polyvinyl fluoride film is rolled on the aluminum panel containing the hot coating of adhesive as it emerges from the oven and inserted immediately in a press for 30 seconds under a load of 4,000 pounds per square inch. The upper platen in the press is held at 190° C. and the bottom platen at 200° C. To insure uniform lamination, the laminate is inserted in the press in a layup comprising, successively, a lower layer of silicone rubber about ¼-inch thick, a layer of poster board, the polyvinyl fluoride laminate, a layer of aluminum foil and another layer of poster board.

*Evaluation of Laminate*

When an attempt is made to strip the polyvinyl fluoride film in the laminate of this invention described above from the aluminum substrate, the film tears before the adhesive fails either adhesively or cohesively. The above laminate can be boiled in water for greater than 200 hours without any significant reduction in bond strength. The laminate also withstands greater than 1,000 hours in a type HVDL–X Atlas Weather-Ometer without any substantial reduction in bond strength. In the Weather-Ometer, a device employing twin carbon arcs, the laminate is subjected alternately to an hour of water spray in darkness two hours of light from the carbon arcs, two hours of water spray in darkness and 6 more hours of light. The above laminate can be sharply deformed without any loss in bond strength; for example, it can be sharply bent or even creased without destroying the bond. Prior art polyvinyl fluoride laminates either fail in one or more of the aforementioned tests or require prolonged aging or two-package adhesives.

EXAMPLE 2

The following materials are charged to a closed reaction vessel and heated under a nitrogen blanket for 6 hours at 92° C.:

| | Parts |
|---|---|
| Methyl methacrylate | 223.84 |
| Glycidyl methacrylate | 5.04 |
| Benzoyl peroxide | 1.81 |
| Toluene | 161.19 |
| Isopropanol | 69.08 |

The resulting polymer has an inherent viscosity of 0.25 measured in a 0.5% solution in methylethyl ketone, a molecular weight of about 81,000 and a glass transition temperature of about 116° C. After dilution with 80.7 parts of toluene and 226.5 parts of isopropanol the solution contains about 30% solids and has a viscosity of about 6.9 poises.

The above copolymer is charged to a closed reaction vessel, then anhydrous ammonia is charged thereto to a pressure of 45 pounds per square inch gauge. The reaction mixture is then held for 6 hours at about 80° C. Ammonia is stripped from the reaction mixture by reducing the pressure in the reactor at a rate of 10 millimeters of mercury per minute until a pressure therein is 100 millimeters of mercury absolute and then holding the reactor at that pressure and at a temperature of 40° C. for 5 hours. The resulting product, which has a viscosity of about 11.8 poises contains about 30% of a copolymer of 97.8% of methyl methacrylate and about 2.2% of glycidyl methacrylate which contains about 0.216% of combined amino nitrogen.

Laminates are prepared by coating the above adhesive onto various substrates at a wet-film thickness of about 2.4 mils, allowing the adhesive to dry at room temperature for about 30 minutes, heating the coated adhesive for 2 minutes in a hot-air oven at 200° C., laying the chemically activated surface of a film of polyvinyl fluoride such as that described in Example 1 on the hot adhesive and passing the resulting laminate through a pair of nip-rolls which exert a pressure of about 500 to 600 pounds per square inch thereon. The substrates employed are: cold-rolled steel having a conventional microcrystalline, iron-phosphate coating and an aluminum substrate such as that described in Example 1. When an attempt is made to delaminate each sample, the polyvinyl fluoride film fails before the intermediate adhesive layer fails either cohesively or adhesively. No decrease of adhesive or cohesive strength of the laminates is noted after either exposure to an atmosphere at 100° F. and 100% relative humidity for 12 weeks or immersion in water at 40° C. for 12 weeks.

EXAMPLE 3

54 parts of methyl methacrylate, 6 parts of 2-hydroxy-3-aminopropyl allyl ether, 0.6 part of alpha,alpha'-azodiisobutyronitrile, 75 parts of toluene and 15 parts of isopropanol are charged to a closed reaction vessel and heated under autogenous pressure for 16 hours at 75° C. The resulting product contains a 37.3% solids corresponding to a 93% conversion and has a Gardner-Holdt viscosity of N. The polymer in the reaction mixture contains about 0.3% of amino nitrogen. Next, the polymer, which has a glass transition temperature of about 116° C., is precipitated with methanol to remove residual monomer, then redissolved in an equal weight mixture of isopropanol and toluene to yield a 30% adhesive solution. The resulting adhesive is applied to steel substrates having a conventional iron phosphate coating and allowed to stand at room temperature for ½ hour. Next, the coated substrate is placed in an oven and heated to 190° C. for 2 minutes. As the resulting product issues from the oven, the activated surface of a 2-mil film of polyvinyl fluoride similar to that described in Example 1 is laid on the hot adhesive, passed through nip rolls, then inserted in a press the platens of which are heated to 190° C. and pressed at about 4,000 pounds per square inch for about 2 minutes. The resulting laminate shows good interlayer adhesion and good cohesive strength.

EXAMPLE 4

The following materials are charged to a reaction vessel and heated under a nitrogen blanket at 85 to 90° C. for 6 hours:

| | Parts |
|---|---|
| Methyl methacrylate | 40 |
| n-Hexyl methacrylate | 57 |
| Glycidyl methacrylate | 3 |
| Toluene | 33.3 |
| Isopropyl alcohol | 33.3 |
| Alpha,alpha'-azodiisobutyronitrile | 0.20 |

Next, 0.2 more part of the aforementioned catalyst is added to the reaction mixture which is then heated for an additional 3 more hours at 85 to 90° C. The resulting solution is diluted with 71.7 parts of toluene and 161.7 parts of isopropanol to yield an adhesive having a Brookfield viscosity of 0.65 poises using a No. 1 spindle at 6 r.p.m. The polymer therein has a glass transition temperature of about 43° C.

The above reaction mixture is charged to an autoclave which is pressured with ammonia to 145 pounds per square inch gauge, then heated for 16 hours at 70° C. Ammonia is stripped from the reaction mixture by reducing the pressure thereon to 100 millimeters of mercury and holding the mixture at 40° C. at that pressure for 5 hours. The resulting polymer contains about 0.3% of amino nitrogen.

Two 10-mil wet coatings of the aforementioned adhesives are applied to a ¼-inch fir plywood. The adhesive coated wood is then dried 30 minutes at room temperature and then heated for 10 minutes at 150° C. Next, the laminate is removed from the oven and immediately a surface receptive, boron trifluoride treated film of polyvinyl fluoride is laid on the adhesive coated surface of the plywood. The resulting laminate is then pressed for 5 minutes in a manner substantially similar to that described in Example 1. Upper and lower platen temperatures of 150 and 160° C. are used.

In the resulting product the film of polyvinyl fluoride tears before the laminate fails either adhesively or cohesively. The laminate has excellent weather resistance.

EXAMPLE 5

A copolymer is prepared from 97 parts of ethyl methacrylate and 3 parts of glycidyl methacrylate by a procedure substantially similar to that described in Example 2. The above copolymer has an inherent viscosity of 0.53 measured at 25° C. in a 0.5% solution of methyl ethyl ketone. A 25.2% solution of the above copolymer in a mixture of toluene and isopropanol is next ammoniated in a closed reaction vessel pressured to about 150 pounds per square inch gauge with anhydrous ammonia and heated for 16 hours at about 70° C. After the reaction is substantially complete, excess ammonia is stripped therefrom under reduced pressure to yield a 25.2% solution of polymer having a Brookfield viscosity of about 1.52 poises using a No. 1 spindle and 6 r.p.m. The copolymer contains about 0.29% of amino nitrogen and has a glass transition temperature of about 73° C.

A 2.4-mil wet coating of the above adhesive composition is applied to a rigid unplasticized sheet of polyvinyl chloride containing a small portion of thermal stabilizer and titanium dioxide pigment. The coating is air dried at room temperature for 30 minutes, then heated for 15 minutes at 150° C. Next, a surface of a 2-mil clear film of polyvinyl fluoride treated with boron trifluoride as previously described is laid on top of the hot adhesive coating and the resulting laminate is inserted in a press in a layup comprising, successively, a lower layer of ¼-inch silicone rubber, a layer of poster board, aluminum foil, the laminate, another layer of aluminum foil and a top layer of poster board. The upper platen is heated at 150° C. and the lower platen is heated at 75° C. The layup is held in the press under a pressure of 2,000 pounds per square inch for 5 minutes.

When an attempt is made to separate the layers in the laminate just described, the film of polyvinyl fluoride fails before the adhesive layer fails either adhesively or cohesively. The resulting laminate also has excellent resistance to weathering, and particularly ultraviolet light does not cause any yellowing thereof.

If the procedure described above is repeated except that a phenol-formaldehyde resin impregnated, wood-fiber board is substituted for the polyvinyl chloride substrate used above, substantially similar results are obtained. The product will withstand more than 200 hours in boiling water without adhesive or cohesive failure.

EXAMPLE 6

The following materials are charged to a closed reaction vessel and heated in a nitrogen atmosphere at 80° C.:

| | Parts |
|---|---|
| Tertiary butyl acrylate | 97 |
| Glycidyl methacrylate | 3 |
| Alpha,alpha'-azodiisobutyronitrile | 0.2 |
| Benzene | 66.6 |

After about 1 hour, 44.4 parts of benzene are added to the reaction mixture. After an additional hour, 50 parts of isopropanol are added to the reaction mixture along with 50 more parts of benzene and, finally, after 10 hours, 89.0 parts of isopropanol are added thereto.

The copolymer above is ammoniated as described in Example 1 to yield a polymer containing about 0.29% of amino nitrogen and having a glass transition temperature of about 43° C. The adhesive described above is used to adhere a 2-mil film of polyvinyl fluoride to a sheet of chromate-treated aluminum by the general procedure described in Example 1 to yield a product of this invention having among other outstanding properties, good interlayer adhesion and weather resistance.

EXAMPLE 7

A copolymer of 55% of styrene, 34% of ethyl acrylate, 8% of acrylonitrile and 3% of glycidyl methacrylate is prepared by the general procedure described in the preceding example. Next, about 200 parts of a 30% solution of the above copolymer in 65% of toluene and 35% of isopropanol is charged to a shaker tube, then anhydrous ammonia is charged thereto to bring the total pressure up to 100 p.s.i. at 70° C. The resulting charge is held at 70° C. and 100 p.s.i. for 8 hours, then the excess ammonia is vented and the resulting product is held under a pressure of about 100 millimeters of mercury absolute at 55° C. for 3 hours. The polymer in the resulting adhesive composition contains about 0.50% of amino nitrogen and has a glass transition temperature of about 50° C.

The adhesive described above is coated onto a sheet of chromate-treated aluminum, heated, then a film of boron trifluoride-treated polyvinyl fluoride is laid thereon and heated in a press all by the general procedure and at the conditions described in Example 1. The polyvinyl fluoride film in the resulting laminate cannot be stripped therefrom. The product has excellent formability and, for example, can be bent or even sharply creased without any substantial decrease in the adhesive or cohesive bond strength.

EXAMPLE 8

A 22% solution in a mixture of 45% of toluene and 55% of isopropyl alcohol of a copolymer of 30.8% of methyl methacrylate, 61.5% of butyl methacrylate and 7.7% of glycidyl methacrylate is prepared by the procedure described in Example 1. To 180 parts of the polymer solution described above are added, slowly, 38 parts of methyl amine. The resulting solution is heated at 70° C. under autogenous pressure for 12 hours, cooled, then excess amine is vented therefrom. Finally, excess amine is stripped from the solution at 50° C. under a pressure of about 100 millimeters of mercury absolute over a period of 24 hours. The resulting product contains 24.1% solids and has a Brookfield viscosity of 3.42 poises using No. 1 spindle at 6 r.p.m. The polymer therein contains 0.70% of amino nitrogen.

A laminate is prepared from a 2-mil film of boron-trifluoride treated polyvinyl fluoride, the adhesive described above and a substrate of chromate-treated aluminum by the procedure and under the conditions described in Example 1. The layers in the resulting laminate cannot be separated and the laminate will withstand more than 200 hours' exposure to boiling water and, for example, will withstand 180° bends without any substantial loss in adhesive or cohesive bond strength.

EXAMPLE 9

A copolymer of 32.5% of methyl methacrylate, 64.0% of butyl methacrylate and 3.5% of glycidyl methacrylate having a molecular weight of about 560,000 is prepared by the general procedure described in Example 1. 500 parts of a 23.8% solution of the above polymer in a mixture of 35% of toluene and 65% of isopropyl alcohol is treated with 2.04 parts of ethanol amine and heated at reflux, about 80° C., for 10 hours. The resulting product contains about 24% of a polymer containing 0.25% of combined amino nitrogen. The above adhesive is used to laminate a 2-mil sheet of polyvinyl fluoride to a sheet of chromate-treated aluminum such as that described in Example 1 by the procedure and under the conditions described in that example. The resulting product of this invention has excellent adhesive and cohesive strength, has excellent formability and will withstand more than 948 hours' exposure to boiling water.

EXAMPLE 10

A 2.4-mil wet film of the adhesive described in Example 9 is coated onto a sheet of chromate-treated aluminum, dried at room temperature for 30 minutes, then baked for 1 minute in a hot-air oven held at 200° C. As the coated substrate emerges from the oven, it is passed through a nip-roll where the activated surface of a 2-mil film of polyvinyl fluoride is applied to the hot adhesive coating. The resulting product is finally pressed as described in Example 1 to yield a laminate of this invention having properties similar to those of the product described in Example 9.

The surface of the film of polyvinyl fluoride described above is activated by passing the film at a rate of about 150 feet per minute over and in contact with a chilled metal drum while the surface not in contact with the drum is passed through a flame fueled with a 1:20, propane:air mixture. Similar results are obtained if the polyvinyl fluoride film is immersed in fuming sulfuric acid at about 60° C. for about 30 seconds, washed with water then dried to activate the surface thereof. Correspondingly, the surface of the film of polyvinyl fluoride can be activated by passing the film through a radio frequency spark discharge in a nitrogen atmosphere at a rate of about 200 feet per minute. The film passes over and in contact with a grounded metal drum and within about 0.010 to 0.025 inch of a bar electrode through which a potential of about 200,000 volts is applied across the polyvinyl fluoride film.

EXAMPLE 11

A biaxially oriented, 2-mil film of $TiO_2$-pigmented polyvinyl fluoride (hereinafter called film A) is immersed for 10 seconds at room temperature in boron trifluoride-ethyl etherate complex, then rinsed thoroughly with diethyl ether and air dried. A second sample of the same polyvinyl fluoride film (hereinafter called film B) is immersed for 1 second in the boron trifluoride-ethyl etherate complex, this time maintained at 85° C., then rinsed and air dried.

A piece of cement-asbestos board siding, siding A, is immersed for 10 seconds at 75° C. in 20% aqueous sulfuric acid, washed in hot water, then washed in cold water and air dried. A second piece of cement-asbestos board siding, siding B, is immersed for 10 seconds in an aqueous 10% zinc chloride/15% phosphoric acid solution at room temperature, washed in hot water, then washed in cold water and air dried.

A 4-mil wet coating of an adhesive substantially similar to that described in Example 2 is applied to one surface of each piece of siding, then air dried to volatilize solvent therefrom. Films A and B are next placed on top of the adhesive coating of sidings A and B, respectively, and pressed for 10 minutes in a layup similar to that used in Example 1 under a pressure of about 150 pounds per square inch between platens held at 180° C.

Initially and after over 5,000 hours of continual exposure in the aforementioned Atlas Weather-Ometer, the polyvinyl fluoride films cannot be separated from the sidings without tearing the film before the adhesive layers fail either adhesively or cohesively.

I claim:

1. A laminate comprising a substrate, a preformed layer of polyvinyl fluoride at least one surface of which is adjacent said substrate and has been chemically activated and, between said substrate and said activated surface, an intermediate adhesive layer comprising a vinyl addition polymer having substituents each of which bears on adjacent carbon atoms a hydroxyl radical and an amino radical bearing at least one active hydrogen atom, said amino radicals in said substituents containing about from 0.01 to 1.0% of amino nitrogen based on the weight of said polymer, said polymer having a glass transition temperature of at least about 35° C.

2. A laminate comprising a substrate, a preformed layer of polyvinyl fluoride at least one surface of which having been chemically activated and, between said substrate and said activated surface, an intermediate adhesive layer comprising a vinyl addition polymer of at least one acrylic ester having substituents each of which bears on adjacent carbon atoms a hydroxyl radical and an amino radical bearing at least one active hydrogen atom, said amino radicals in said substituents containing about from 0.01 to 1.0% of amino nitrogen based on the weight of said polymer, said polymer having a glass transition temperature of at least about 35° C.

3. A laminate of claim 2 having a metallic substrate.

4. A laminate of claim 2 having a cellulosic substrate.

5. A laminate of claim 2 having a cementitious substrate.

6. A laminate of claim 2 having a substrate of vinyl chloride polymer.

7. A laminate comprising a substrate, a preformed layer of polyvinyl fluoride at least one surface of which having been chemically activated and, between said substrate and said activated surface, an intermediate adhesive layer comprising a vinyl addition polymer of at least about 25% by weight of methyl methacrylate having substituents each of which bears on adjacent carbon atoms a hydroxyl radical and an amino radical bearing at least one active hydrogen atom, said amino radicals in said substituents containing about from 0.2 to 0.4% of amino nitrogen based on the weight of said polymer, said polymer having a glass transition temperature of at least about 35° C.

8. A process for forming laminates of polyvinyl fluoride which comprises applying to at least one surface of each pair of surfaces to be adhered an adhesive composition comprising a vinyl addition polymer having substituents each of which bears on adjacent carbon atoms a hydroxyl radical and an amino radical, said amino radicals in said substituents containing about from 0.01 to 1.0% of amino nitrogen based on the weight of said polymer and said polymer having a glass transition temperature of at least about 35° C., drying said adhesive to remove solvent therefrom, bringing together the surfaces to be adhered at least one of which comprises a chemically activated surface of a layer of polyvinyl fluoride and pressing the resulting product while said adhesive is held at a temperature above the glass transition temperature of said polymer therein.

References Cited in the file of this patent

UNITED STATES PATENTS

| | | |
|---|---|---|
| 2,774,704 | Smith | Dec. 18, 1956 |
| 2,781,335 | Cupery | Feb. 12, 1957 |
| 2,809,130 | Rappaport | Oct. 8, 1957 |
| 2,910,723 | Traver | Nov. 3, 1959 |
| 2,935,418 | Berthold et al. | May 3, 1960 |
| 2,940,869 | Graham | June 14, 1960 |
| 2,955,953 | Graham | Oct. 11, 1960 |
| 3,067,078 | Gluck | Dec. 4, 1962 |

UNITED STATES PATENT OFFICE
CERTIFICATE OF CORRECTION

Patent No. 3,133,854

May 19, 1964

John Alvin Simms

It is hereby certified that error appears in the above numbered patent requiring correction and that the said Letters Patent should read as corrected below.

Column 12, lines 43 and 61, for "having", each occurrence, read -- is adjacent said substrate and has --.

Signed and sealed this 8th day of September 1964.

(SEAL)
Attest:

ERNEST W. SWIDER
Attesting Officer

EDWARD J. BRENNER
Commissioner of Patents